United States Patent

Behl

Patent Number: 5,711,905
Date of Patent: Jan. 27, 1998

[54] PROCESS FOR PRODUCING MOLDED ARTICLES FROM FOAMED PLASTIC AND A MOLD FOR PERFORMING THE PROCESS

[75] Inventor: Erhard Behl, Faulbach, Germany

[73] Assignee: Ph. Kurtz Eisenhammer GmbH & Co., Haslock/Main, Germany

[21] Appl. No.: 424,355

[22] PCT Filed: Aug. 27, 1993

[86] PCT No.: PCT/DE93/00783

§ 371 Date: Apr. 26, 1995

§ 102(e) Date: Apr. 26, 1995

[87] PCT Pub. No.: WO94/09973

PCT Pub. Date: May 11, 1994

[30] Foreign Application Priority Data

Oct. 26, 1992 [DE] Germany .......................... 42 36 081.1

[51] Int. Cl.$^6$ ................. B29C 44/02; B28B 7/36
[52] U.S. Cl. ............. 264/51; 249/114.1; 264/53; 264/101; 264/102; 264/334; 425/4 R; 425/444
[58] Field of Search .............. 264/51, 53, DIG. 11, 264/102, 334, 101; 425/4 R, 444; 249/112, 114.1

[56] References Cited

U.S. PATENT DOCUMENTS

| | | | |
|---|---|---|---|
| 3,537,131 | 11/1970 | Kracht et al. | 425/4 R |
| 3,734,449 | 5/1973 | Itou et al. | 249/114.1 |
| 3,941,528 | 3/1976 | Cotterell | 425/4 R |
| 4,081,225 | 3/1978 | Yaita | 425/4 R |
| 4,272,469 | 6/1981 | Smith | 264/53 |
| 4,285,901 | 8/1981 | Yotsutsuji et al. | 264/220 |
| 4,482,306 | 11/1984 | Hahn | 264/51 |
| 4,801,361 | 1/1989 | Bullard et al. | |
| 4,813,859 | 3/1989 | Bullard et al. | |
| 4,934,918 | 6/1990 | Outland | 249/79 |
| 5,037,592 | 8/1991 | Erlenbach | 425/4 R |
| 5,085,814 | 2/1992 | Kamiyama et al. | 425/4 R |
| 5,110,837 | 5/1992 | Harclerode et al. | 264/53 |

Primary Examiner—Allan R. Kuhns
Attorney, Agent, or Firm—Sixbey, Friedman, Leedom & Ferguson; David S. Safran

[57] ABSTRACT

A process for producing a molded part made of expanded foam is configured so that the molded part can be produced with low vacuum and vapor requirements and has a very low residual moisture. This is achieved by using a mold whose walls forming the mold cavity themselves consist of material that conducts heat poorly or are suitably coated, by first evacuating the mold cavity, filling the evacuated mold with the expandable molding compound at excess pressure and, after the filling operation, introducing vapor into the evacuated mold. After turning off the vapor pressure, the mold cavity is again evacuated and the vacuum is maintained during the stabilization phase. After the stabilization phase, the mold is opened and the molded part is ejected by excess pressure (FIG. 1).

15 Claims, 2 Drawing Sheets

FIG. 2
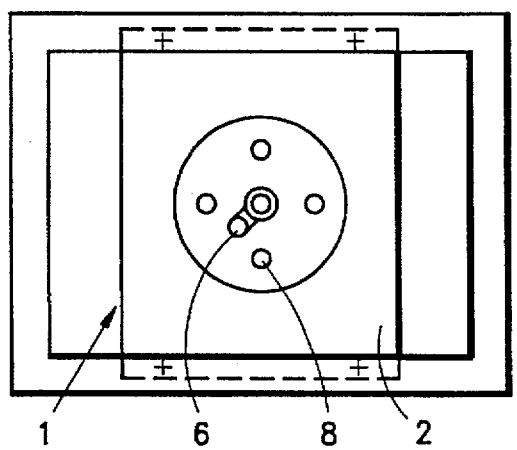
FIG. 3
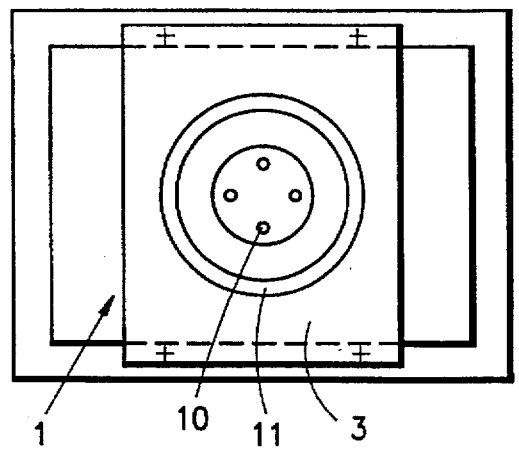
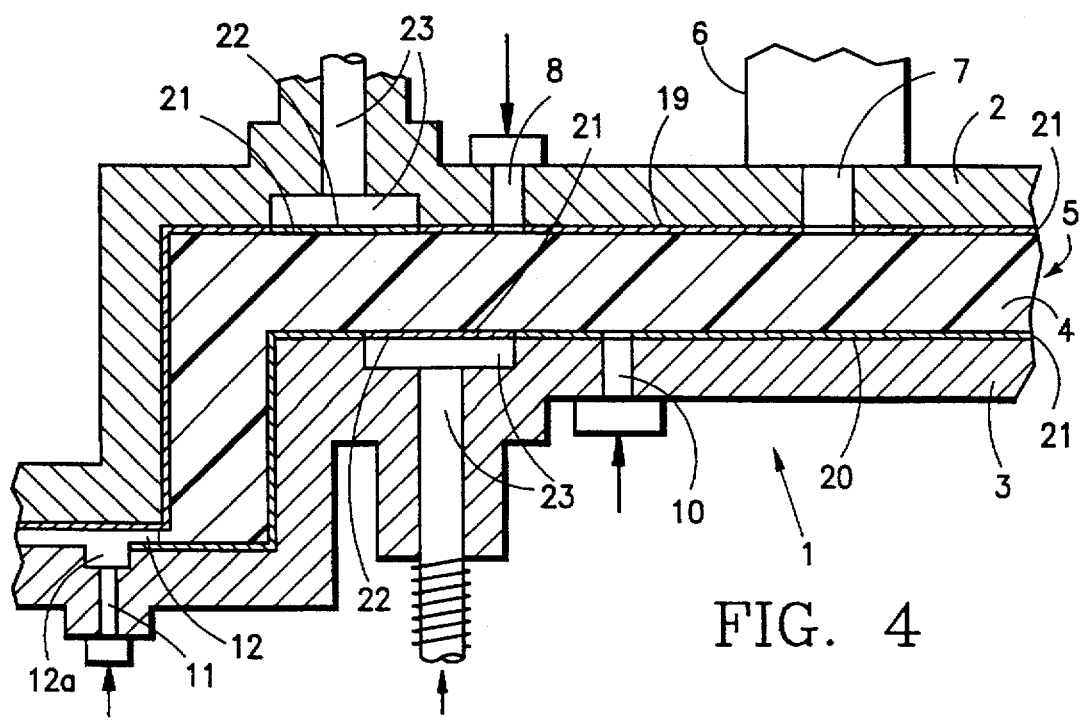
FIG. 4

PROCESS FOR PRODUCING MOLDED ARTICLES FROM FOAMED PLASTIC AND A MOLD FOR PERFORMING THE PROCESS

BACKGROUND OF THE INVENTION

1. Field of the Invention

This invention relates to a process for producing molded parts made of expanded plastic and to a mold for performing this process.

2. Description of Related Art

Such a process for producing molded parts made of expanded plastic is described in the German book: "Expandierbares Polystyrol (EPS) [Expandable Polystyrene]," Reihe Kunststofftechnik [Plastic Technology Series], VDI-Vedag, Duesseldorf 1984, pages 99 to 103. There it is explained that the filling operation with molding compound made of expandable polystyrene can be performed by vacuum filling. For this purpose, the mold cavity is evacuated before tilting and then the feed valve is opened. As advantages of vacuum filling there are indicated: savings in filling air, rifling without a crack gap, with corresponding material savings, shortened filling time and no air between the beads, air that must be expelled by vapor or warmed, which leads to an expectation of a savings in vapor.

As drawbacks there are indicated a limited packing density of the EPS beads and, because of this, the necessary process step "sweeping with vapor" before the transverse steam treatment. Further, a less attractive surface and, generally, a lower quality result than with pressure filling. Therefore, pressure filling is given preference, especially since, in this way, a vacuum pump with far lower capacity needs to be provided. Further, with pressure filling, fewer filling injectors suffice because of the denser packing.

After pressure filling, it is suggested to perform a vacuum sweeping, instead of a vapor sweeping, to extract the air between the beads. With subsequent transverse steam treatment, the vapor can then flow better and savings in vapor is achieved. Then the steam treatment can be performed in the known way.

To cool and stabilize the expanded material, the mold is usually cooled with cooling water. The so-called condensation cooling is also mentioned, in which, cold cooling water is injected into the steam chamber surrounding the mold and thus a partial vacuum of about 0.2 to 0.4 bars is produced. Using condensation cooling yields molded parts with little residual moisture of about 4 to 5 percent by weight.

Demolding and ejection are supported in the usual way, for example with ejectors.

SUMMARY OF THE INVENTION

The object of this invention is to indicate a process and a suitable mold for it with which molded parts made of expanded foam can be produced economically, with low vacuum and vapor requirements and further having very low residual moisture.

Surprisingly, with the simultaneous use of the process steps used in vacuum and pressure filling technology, in combination with condensation cooling, a considerable energy saving is achieved, in particular because of a limited use of vapor and the elimination of separate cooling media. The use of a vacuum before the filling operation and filling by compressed air results in a very intensive filling with even filling density within a very short time.

By introducing the vapor directly into the evacuated mold cavity, without the usual admission of this vapor into the chambers surrounding the mold, the vapor state is maintained and thus an even distribution of the vapor in the mold is achieved, thus avoiding, to the greatest extent possible, condensation of the vapor on the inner walls of the mold, which conduct heat poorly, or on the mold wall layers, which conduct heat poorly. Supplying the mold directly with vapor yields an even condensation of the vapor and thus an intensive energy output to the molding compound, which is expanding during this process step. During the subsequent renewed evacuation of the mold, with the molded part inside it, the condensate of the vapor evaporates. This causes, on the one hand, a cooling of the expanded molded part and, on the other hand, the removal of moisture on the molded part, so that a rapid stabilization of the expanded molded part and low residual moisture of it are maintained. Finally, because of the ejection of the expanded molded part with the support of compressed air, a rapid and residue-free demolding is possible.

The entirety of the process steps used thus yields, compared to known foaming processes, high energy savings up to 70% and thus makes it possible to use production units with lower installed capacity, with shortened cycle time, to produce very dry foam molded parts.

The object of the invention is achieved also by the features that the entire surface of the mold facing the mold cavity has at least one inner mold wall layer made of material that conducts heat poorly and each mold part has at least one opening for direct connection a partial vacuum and/or vapor supply, in which it is important that, besides the mold parts for the actual mold, there be provided no additional chambers at all surrounding the mold on the outside, to avoid additional expense for vapor, for evacuation and also for a separate cooling medium.

Other advantageous details of the invention are the described in more detail below based on the embodiments represented in the drawing.

BRIEF DESCRIPTION OF THE DRAWINGS

FIG. 2 is a plan view of an outer side of a mold provided with a filling injector;

FIG. 3 is a plan view of the inner side of the mold shown in FIG. 2; and

FIG. 4 is an enlarged section of the mold shown in FIG. 1 showing the provision of ejector rods.

DETAILED DESCRIPTION OF THE PREFERRED EMBODIMENT

Figures 1, 1A:
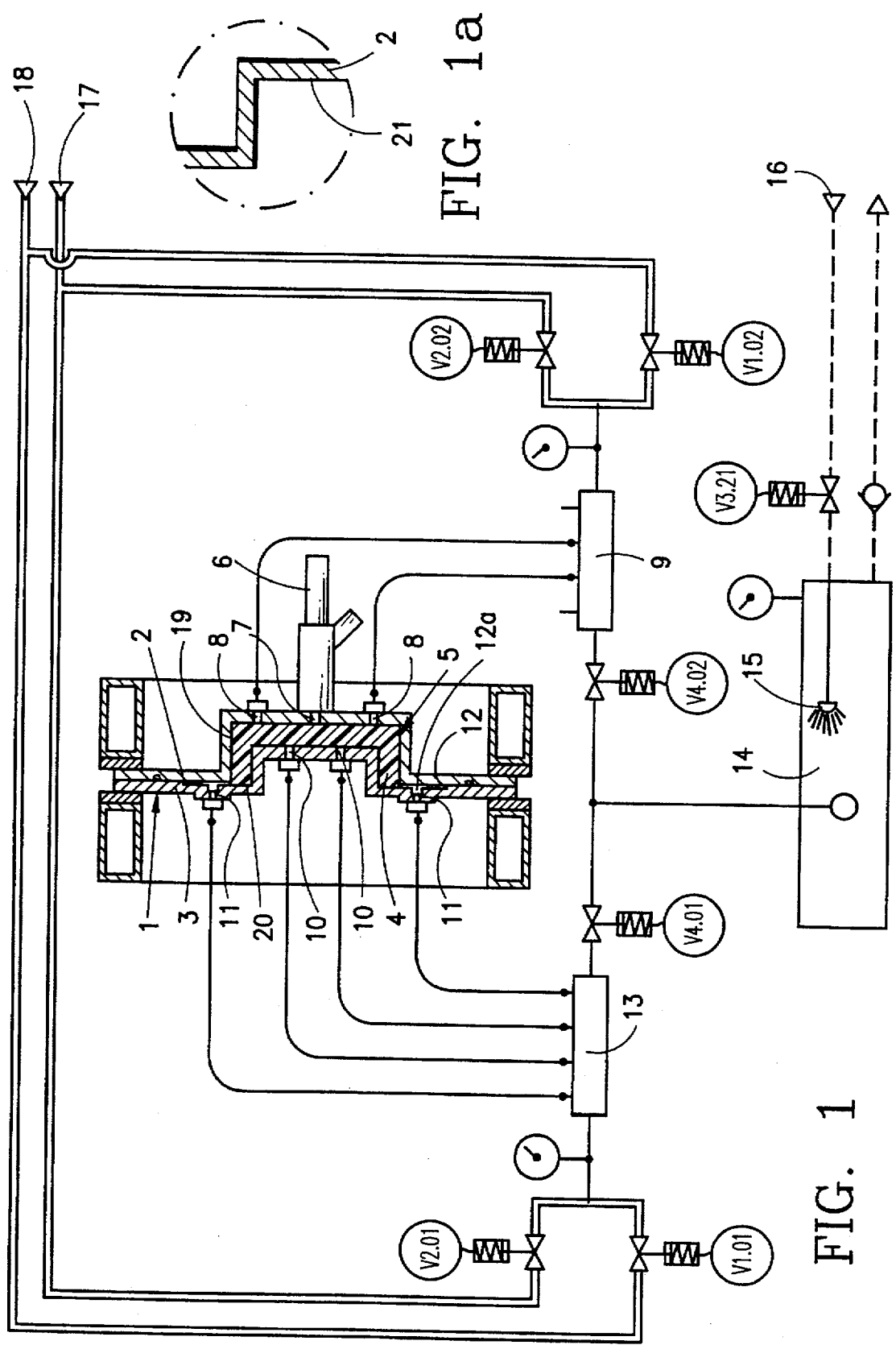
FIG. 1 shows a control diagram of a mold for performing the process according to the invention.
FIG. 1a is an enlarged detail of a section from one of the two mold parts of FIG. 1 with a thermally insulating inner layer.

In FIG. 1, 1 designates a mold consisting of two mold parts 2 or 3 represented in cross section in the closed state. It forms a mold cavity 5 filled with a molded part 4 made of expanded plastic, for example of expandable polystyrene, of expandable copolymerizates of polystyrene or polyethylene, or of expandable polymethylene methacrylate.

Mold part 2 is provided with a filling injector 6 that ends in a filling opening 7 of the mold part. Further, mold part 2 has openings 8 that are attached to a first runner 9. Likewise, mold part 3 has openings 10 in the area of mold cavity 5 and numerous openings 11 provided in the area outside mold cavity 5 and connected to points of separation 12 between both mold parts 2, 3.

If the volume of points of separation 12 should not suffice for the steam treatment and/or for the evacuation, additional enlarged areas 12a, connected to points of separation 12, can be provided.

Openings 10, 11 are attached to a second runner 13.

Runners 9 or 13 are each connected by a valve V 4.02 or V 4.01 to a vacuum tank 14 that is attached to a central vacuum device or to a vacuum pump. In vacuum tank 14 there is provided an atomizer 15 that is connected, by a valve V 3.21, to a water pipe 16.

Runners 9 or 13 are further connected, each by a valve V 2.02 or V 2.01, to a compressed air pipe 17 and, each by a valve V 1.02 or V 1.01, with a vapor pipe 18.

Walls 19 or 20 of mold parts 2, 3 that face mold cavity 5 are provided with a mold wall layer 21 (see FIGS. 1a and 4) that is about 0.3 mm to 4 mm, in particular about 0.5 mm to 3 mm, thick and made of a material that conducts heat poorly. This mold wall layer 21 can consist, for example, of a glaze, of enamel, of plastic, in particular of polytetrafluoroethylene (PTFE), polyesterimide, polyimide or the like. This mold wall layer 21 also covers surfaces 22, facing mold cavity 5, of ejector reds 23, as illustrated in FIG. 4. Ejector reds 23 can be driven hydraulically, pneumatically or mechanically. The remaining parts of mold parts 2, 3, 23 consist of metal, for example of aluminum, steel, steel alloys or the like. The layer thickness of mold wall layer 21 and the thickness of the metal for the remaining parts of mold 1 are selected so that, on the one hand, when vapor is introduced, practically no condensation occurs on inner mold wall layers 21 and so that, on the other hand, during the course of the process there appears, on the outer sides of mold parts 2 or 3, with air cooling alone, i.e., without using separate or additional cooling media, a surface temperature of at most about 50° to 70° C., in particular of about 55° to 60° C.

Mold parts 2, 3, 23 can also consist of a suitably matched plastic, i.e., be made in each case as one part. For example, a heat-resistant casting resin charged with particles and/or fibers that conduct heat well, for example of metal, can be used, with which comparable conditions are achieved thermally, i.e., with respect to the surface temperature of mold parts 2, 3, as described above.

Optionally, in particular with mold parts 2, 3 made of plastic, the outside contours of these mold parts 2, 3 can be configured so that the surface temperature of mold 1 of 50° to 70° C., deemed advantageous, is achieved. They can, for example, be ribbed or provided in another way with an uneven surface, which is easily possible because of measures known in casting technology.

The process for producing a dimensionally stable molded part 4 made of expanded plastic, in particular of expandable polystyrene, is performed in the following way:

First—as represented—mold 1, made of two or more parts, as is known, is closed quickly and, shortly before the closed position, at extra slow speed. Then, by opening valves V 4.02 and V 4.01, a partial vacuum is applied inside mold cavity 5 and it is adjusted to a value of at least about 0.05 to 0.1 bar. Likewise, a corresponding partial vacuum is applied from the outside, by openings 11, to points of separation 12.

After the desired partial vacuum is reached in mold cavity 5, mold cavity 5 is filled with an expandable molding compound by filling injector 6 at a partial vacuum of about 1.0 to 2.0 bars. Because of the partial vacuum present in mold cavity 5 and because of the excess pressure of filling, a very rapid and even filling of mold cavity 5, with homogeneous packing density to the greatest extent possible, is achieved.

After closing filling injector 6, valves V 4.01 and V 4.02 for applying the partial vacuum remain open and, by opening valve V 1.02, vapor is introduced by vapor pipe 18 into runner 9, sweeping the remaining air in the pipe system through partial vacuum valve V 4.02 into vacuum tank 14. Then partial vacuum valve V 4.02 closes and the vapor is introduced into filled mold cavity 5. A sweeping effect by steam treatment results, sweeping the residual air in the interspaces of the molding compound, by the pipe system, into runners 13 and, by partial vacuum valve V 4.01, into vacuum tank 14. Then, by opening valve V 1.01, vapor is introduced into runners 13, sweeping residual air, possibly still present in the pipe system, by partial vacuum valve V 4.01, into vacuum tank 14. Then partial vacuum valve V 4.01 also closes and the vapor, at about 120 degrees Celsius and about 1 bar (excess pressure), is conveyed to openings 10, 11. In this way, a vapor pressure at a temperature corresponding to the softening temperature of the molding compound is established in mold cavity 5, causing the vapor to condense on the molding compound and the condensation energy to be released to the molding compound. Thus the molding compound expands into a molded part 4 that completely fills mold cavity 5 and whose surface is made with open cells.

After the expansion operation, valves V 2.02 and V 2.01 are closed and valves V 4.02 and V 4.01 are again opened. Thus a partial vacuum again is produced in mold cavity 5. This causes the condensate again to go into the vapor state and a cooling of molded pan 4 occurs, since the heat of evaporation is extracted from molded part 4 and is immediately taken away by the partial vacuum. This state is maintained during the stabilization phase, i.e., during the time in which molded part 4 assumes its final form, which it also retains after demolding. After this, valves V 4.02 and V 4.01 are closed and then mold 1 or mold parts 2, 3 are opened, first at extra slow speed and then quickly and then, by opening valves V 2.02 and V 2.01, foamed molded part 4 is ejected, preferably with the support of compressed air, by ejector reds 23.

During this process, the purposeful matching of mold material or of mold and layer material 2, 3 or 21 to the outside surface of the mold, a temperature of at most about 50° to 70° C., in particular of about 55° to 60° C., is maintained, without a cooling of mold 1 by additional cooling media being necessary.

To achieve a quicker production of the partial vacuum when cooling molded part 4 by applying the vacuum during the stabilization phase, during this time cool water is sprayed by atomizer 15 into vacuum tank 14 by opening valve V 3.21. This results again in a condensation of the extracted vapor.

With the process according to the invention described above, there is achieved, with short work cycles, a very dimensionally stable, dry molded part 4, without having to surround mold 1 with special vapor chambers or partial vacuum chambers. Vacuum and vapor thus finally reach, in each case by the shortest path and in an extremely energy-conserving way, mold cavity 5, without having to evacuate or heat additional volumes of air.

According to another advantageous configuration of the invention, the surface of mold wall layers 21, which form the inner walls of mold cavity 5, can be provided with grooves that end in one or more openings and that are about 0.1 mm to 0.3 mm wide and about 0.5 mm to 1.0 mm deep. In this way, accelerated evacuation and supply of hot vapor are possible and thus a considerable shortening of the production cycle results.

As surfaces or layers made of material that conducts heat poorly, plastics or plastic layers with heat conductivity less than 0.25 W/mK are to be understood.

In the process according to the invention described above, mold cavity 5 corresponds in volume to molded part 4, i.e., the volume of air inside mold cavity 5 is kept as small as possible. The vapor is introduced directly and on the shortest path into mold 1, which has two or more parts. This ensures that the condensation of vapor on the surroundings of molded part 4 can be kept at a minimum. It is advantageous that molded part 4, because of the configuration of the inner walls or mold wall layers 21 of mold parts 2, 3, receives a surface with open cells, which makes it possible to achieve a rapid decrease in pressure, during the stabilization phase, from the inside to the outside of molded part 4, which is subject to an internal excess pressure. The energy saving of up to 70%, claimed to be especially advantageous, is based on the minimal heating of the mold, made of two or more parts, because of the insulating measures provided or production of the mold of material that conducts heat poorly.

Contributing to this high energy saving is also especially the fact that vapor valve V 1.02 is opened, already when partial vacuum valves V 4.01 and V 4.02 are still open, and specifically with the effect of correspondingly sweeping out the volumes of air left in the runner or in pipe system 9.

Also contributing to this high energy saving is the fact that a short time after the beginning of the steam treatment, i.e., after about one second or only slightly longer, partial vacuum valve V 4.02 is closed and, when more vapor is supplied by vapor valve V 1.02, the described steam treatment of mold cavity 5 begins and thus the residue air is swept out of the interspaces in the molding compound.

Finally, it is also advantageous for a favorable energy balance if vapor valve V 1.01 is opened when partial vacuum valve V 4.01 is still open, to sweep out the residue air in the runner or in pipe system 13.

Instead of the steam treatment of molded part 4 from mold part 2 to mold part 3, described based on FIG. 1, the steam treatment can also be performed in the reverse direction from mold part 3 to mold part 2. Here, the individual valves are operated in the suitable sequence.

In a mold 1 that has more than two parts, a partial vacuum-and/or a connection to vapor—can be provided at least to each of several or to all mold parts.

The steam treatment of molded part 4 is performed—as usual—with dry vapor (saturated steam) at about 120° C. and about 1 bar excess pressure.

With the process according to the invention and the mold according to the invention, produced molded parts 4 have a residual moisture of at most only still 3 percent by weight.

I claim:

1. Process for producing a molded part of expanded plastic, comprising the steps of:

Using a mold with at least two parts having walls which form a mold cavity and are made impermeable to gas and which have surfaces facing the mold cavity which are made of material that conducts heat poorly;

Closing the mold to close the mold cavity;

Applying a partial vacuum to the mold for evacuating the mold cavity and applying a partial vacuum to the mold outside of the area of the mold cavity to evacuate points of separation between the mold parts;

Filling the mold cavity with a heat-expandable molding compound through a filling opening via at least one filling injector at a pressure above atmospheric pressure;

Closing the filling opening or shutting off the filling injector;

Steam treating the evacuated mold cavity

Shutting off the partial vacuum by closing partial vacuum valves while vapor is being supplied to expand the molding compound;

Cooling a molded part made in the mold cavity exclusively by applying partial vacuum to the mold during a stabilization phase;

Opening the mold after the stabilization phase and ejecting the molded part produced.

2. Process according to claim 1, wherein said steam treatment is performed by supplying steam to the mold cavity via vapor valves and comprises opening of a one of the vapor valves for supplying steam to one side of the mold while partial vacuum is applied to opposite sides of the mold.

3. Process according to claim 2, wherein a short time after the start of the steam treatment, a partial vacuum valve for applying partial vacuum to said one side of the of the mold is closed.

4. Process according to claim 1, wherein the steam treatment is performed by opening a vapor valve for supplying steam to one side of the mold when a partial vacuum valve for applying partial vacuum to that side of the mold is still open.

5. Process according to claim 1, wherein the partial vacuum is applied, and steam vapor is introduced, directly into the mold.

6. Process according to claim 1, wherein the partial vacuum and steam vapor are applied by the same openings of the mold.

7. Process according to claim 1, wherein the partial vacuum is selected so that the air in the mold cavity is reduced to about 0.05 to 0.1 bars.

8. Process according to claim 1, wherein the heat conductivity of at least a layer of the walls of the mold parts forming the mold cavity are selected so that, an outside temperature of the mold does not take on a value higher than about 50° to 70° C.

9. Process according to claim 1, wherein steam vapor of about 120° C. and an excess pressure of about 1 bar is introduced into mold (1).

10. Process according to claim 1, wherein the stabilization phase lasts about 5 sec to 10 sec.

11. Process according to claim 1, wherein the partial vacuum and steam vapor are each supplied by several openings directly to mold cavity.

12. A mold for producing a molded part of expanded plastic made of two or more parts having mold walls with surfaces defining a mold cavity for producing molded parts said surfaces of the mold parts defining the mold cavity having at least an inner mold wall layer made of material that conducts heat poorly; wherein each mold part is directly connected to supply lines for partial vacuum and steam via at least one opening in the mold walls, and wherein the supply lines for partial vacuum are connected to the mold at positions for evacuating the mold cavity applying a partial vacuum to the mold outside of the area of the mold cavity for evacuating the mold at points of separation between the mold parts and for cooling the molded part made in the mold cavity exclusively by the application of partial vacuum to the mold.

13. Mold made of two or more parts having mold walls with surfaces defining a mold cavity for producing molded parts said surfaces of the mold parts defining the mold cavity having at least an inner mold wall layer made of material that conducts heat poorly; wherein each mold part is directly connected to supply lines for partial vacuum and steam via at least one opening in the mold walls; and wherein at least one of mold parts has at least one ejector rod with a surface projecting into the mold cavity, the ejector rod surface having a layer which poorly conducts heat.

14. Mold comprising at least two parts having surfaces defining a mold cavity for producing molded parts, said surfaces of the mold parts defining the mold cavity having at least one inner mold wall layer made of material that conducts heat poorly and each mold part having at least one opening for directly connecting the mold cavity to a supply of at least one of partial vacuum and steam vapor wherein the mold has at least one partial vacuum opening to evacuate points of separation between the at least two mold parts.

15. Mold made of two or more parts having mold walls with surfaces defining a mold cavity for producing molded parts said surfaces of the mold parts defining the mold cavity having at least an inner mold wall layer made of material that conducts heat poorly; wherein each mold part is directly connected to supply lines for partial vacuum and steam via at least one opening in the mold walls; and wherein there are provided, on the surface of the walls forming the mold cavity, grooves with a width of about 0.1 mm to 0.3 mm and a depth of about 0.5 mm to 1.0 mm that end in said at least one of opening as a means for accelerating at least one of evacuation of air from the mold and supplying of steam vapor into the mold (8, 10).

* * * * *